UNITED STATES PATENT OFFICE.

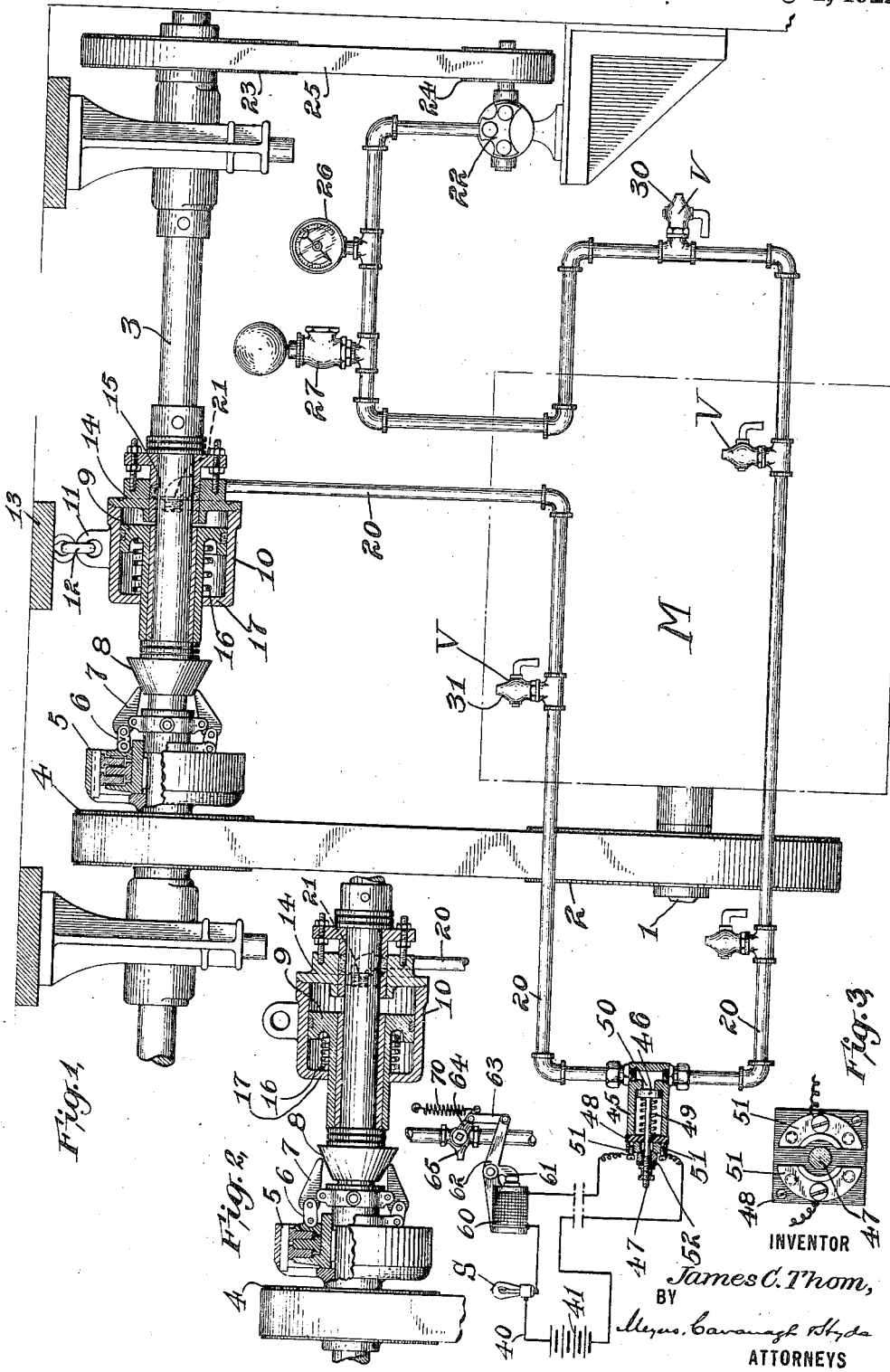

JAMES C. THOM, OF CHICAGO, ILLINOIS, ASSIGNOR TO COMBINATION MACHINE COMPANY, A CORPORATION OF DELAWARE.

MACHINE-CONTROL APPARATUS.

1,424,325.  Specification of Letters Patent.  Patented Aug. 1, 1922.

Application filed October 23, 1920. Serial No. 419,039.

*To all whom it may concern:*

Be it known that I, JAMES C. THOM, a citizen of the United States, and resident of Chicago, in the county of Cook and State of Illinois, have invented certain new and useful Improvements in Machine-Control Apparatus, of which the following is a specification.

This invention relates to a system or apparatus for controlling machines and more particularly to means for stopping a machine from one or a number of different stations, for preventing starting of the machine from one of the stations, unless suitable conditions exist at the other stations; for limiting the driving force applied to the machine and for controlling the stopping and starting of one machine in accordance with the running condition of another.

The machine to be controlled may be practically any machine, driven from any convenient source of power, for example, a machine tool driven from a line shaft or counter shaft. It is often desired to stop and start such a machine from a number of different positions adjacent to the machine or even from a remote position. Devices proposed for this purpose generally are such that the machine can not only be stopped from any of the stations, but if the controlling device is suitably operated from any station it will be definitely started; thus, for example, the machine may have been stopped by one workman at one station for the purpose of adjustment, and it may then be started by another workman at another station before the adjustment is completed, resulting in injury to the first workman, to the work, or to the machine. A principal object of my invention is to avoid this difficulty by providing apparatus which enables the machine to be stopped from any one of a number of stations and prevents the machine from being started from any station until the proper starting operation has been performed at the station first mentioned.

Machine tools and other machines are frequently worked in series; that is one machine may perform a certain operation on work and the work may be delivered to a second machine which performs another operation on the work, and consequently is desirably driven concurrently with the first machine. Therefore, when the first machine stops it is usually desirable to stop the second machine to prevent its idle operation or improper operations upon the work. Another important object of my invention, therefore, is to provide means for controlling such a second or subordinate machine in accordance with the running condition of the first or principal machine. More particularly, for example, the object is to stop the second machine when the first machine is stopped and if desired to start the second machine when the first machine is again started.

Another object is to provide a signal for or near the second machine to indicate the stopping or starting of the first machine.

Another object is to provide means in connection with other features of the invention for regulating the effective power applied to drive the controlled machine.

While the invention may be embodied in widely different forms, in its broadest aspect, a preferred embodiment utilizes air under pressure as the principal operative agent. In such an embodiment the controlled machine is driven by a clutch from a line shaft or counter shaft. The line shaft or counter shaft drives an air pump which supplies a controlling pipe line. This line communicates at one point with a suitable pneumatic mechanism for operating the clutch. A pressure regulator is provided to limit the pressure in the pipe line and this regulator may be adjusted to limit the driving torque of the clutch and so to limit the power applied to drive the machine. A number of vents or bleeder valves are provided in the pipe, and the pipe is laid about the control machine or extended to a remote point so that the vents or bleeder valves may be located at any desired number of different stations, near or remote from the machine. If any one of the valves is opened the pressure in the pipe line is reduced and the clutch is released by its operating device and the machine stopped. If at the same time any other valve is opened at any of the other stations the closing of such other valve is ineffective to start the machine so long as the valve first opened remains so. Therefore, a workman at another station cannot inadvertently start the machine until the workman who has first stopped it has closed the valve at that station; in other words, the machine may be stopped by opening any valve and can be started only by closing all of the valves in the control line.

When a subordinate machine is driven in operative relation to the first or principal machine it may be controlled in a similar manner and provided with a control pipe line supplied from a pump driven from the same or another line, or counter shaft and with other suitable devices, as in the case of the principal machine; and by suitable means, such as an electric circuit controlled by a device operated by air pressure in the first control pipe line, one of the valves in the control line of the subordinate machine may be operated to stop the subordinate machine when the first machine is stopped; and the mechanism may be arranged so that the second machine is started automatically upon restarting the first machine or so that the second machine can be restarted only by manual operation.

A signal for or adjacent to the subordinate machine may also be provided, such as an electric lamp in an electric circuit controlled by a pressure device operated by pressure in the control line of the first machine.

The accompanying drawing shows in a somewhat diagrammatic way one exemplifying embodiment of the invention. After considering this in connection with the detail description it will be evident that the invention may be embodied in many different forms, and I contemplate the employment of any structures which are within the scope of the claims.

In the drawings:

Fig. 1 is a diagrammatic view, partly in section of a representative form of the control apparatus in relation to a typical controlled machine;

Fig. 2 is a sectional view showing another operative position of the clutch and its operating mechanism; and Fig. 3 is a detail of contacts for the electric circuit of control or signal mechanism for a subordinate machine.

The rectangle M represents any machine, having a drive shaft 1, carrying drive pulley 2. A shaft 3, which may be a line shaft, or a counter shaft pertaining only to the controlled machine or that machine and a subordinate machine, referred to later, carries a loose pulley 4 and a pulley clutch 5 which may be of any suitable type, but may conveniently be a multiple disk clutch operated by toggle mechanism 6, including dogs 7 and a sliding cone 8 co-operating with the free ends of the dogs. In a preferred embodiment of the invention the cone is operated by a piston 9 moving in a pneumatic cylinder 10 and conveniently the cylinder may be supported on shaft 3 with the piston slidably mounted on the shaft. The cylinder may be additionally supported and prevented from rotating by means of an eye 11 formed on the cylinder and connected by a chain or link 12 to a fixed support or beam 13. The cylinder has a head 14 provided with a suitable packing 15 about the shaft. A spring 16, acting between the piston and end 17 of the cylinder tends to move the piston in a direction to withdraw cone 8 from dog 7 and so release the clutch.

A pipe 20, which may be identified as the control line or control pipe of the apparatus, communicates at a suitable point, conveniently one end of the pipe, at 21, with the interior of cylinder 10 between head 14 and the piston. Air under pressure is supplied to pipe 20 by any suitable pump 22, which may in a particular case be of the blower type. This pump is driven in any suitable way, conveniently from shaft 3, by pulleys 23, 24, and belt 25. Pipe 20 is desirably provided with a pressure gage 26 and is also provided with a pressure regulator 27 which may be of any convenient type including suitable adjustments for regulating pressure in the pipe, for instance, by blowing off into atmosphere when the operating pressure determined by the adjustment is exceeded. Pipe 20, as indicated, may extend in different directions adjacent to or remote from the machine M and it may have any suitable branches (not indicated in the drawing). The pipe is provided at any desirable number of places with vents, sometimes designated as bleeder valves, designated generally as V, and certain ones being identified as 30, 31, for purposes of description.

When shaft 3 is running, if all of the valves V are closed, pump 22 maintains an air pressure in pipe 20, limited by pressure regulator 27 as then adjusted. This pressure is applied to piston 9 which is moved against spring 16, and clutch 5 is thus engaged and the machine is driven with a force limited by the momentary air pressure; and the drive of the machine may be controlled irrespective of deliberate stopping or starting, by adjusting the pressure regulator. For instance, the regulator may be adjusted to maintain an air pressure sufficient to engage the clutch with proper force to drive the machine under its normal load. If the load is increased, for instance, by the introduction into the machine of an abnormal piece of work, by accidentally clogging of the running parts of the machine, or otherwise, the clutch will slip to a corresponding extent and so damage to the machine or the work is reduced or prevented. The driving effect may evidently be varied by readjustment of regulator 27 to suit different working conditions, this adjustment accomplishing in effect a variation in the slipping point of the clutch.

With the machine running normally and with any suitable pressure in the control pipe, sufficient to cause the clutch to drive the machine properly, the machine may be immediately stopped from any of the operating stations, for instance, the station corresponding to valve 30, by opening that valve. This permits air in the pipe to blow off to atmosphere and immediately reduces pressure in the pipe, and piston 9 is retracted by its spring, thus disengaging the clutch and stopping the machine. If now any other valve, such as valve 31 at another station, is opened, the closing of valve 30 is ineffective to start the machine, since air will still be discharged through valve 31 and the necessary clutch-engaging pressure cannot be built up in the air system. Therefore, the machine cannot be started from any station, unless the valves at all other stations are closed; in other words, to start the machine, a deliberate starting operation must be made at any or all stations at which a stopping action has been previously made. It is evident, therefore, that inadvertent starting by an operator at one station, which might result in injury to the machine or its work, or to an operator at another station, is prevented.

When another machine (not indicated in the drawing) is to be operated in conjunction with the machine shown, it may be desired to signal the operator of the second machine to indicate the operation of the stopping means of the first machine. Such a device is exemplified in the present device as follows: An electric lamp S is located near the second machine in a circuit 40, having a suitable source of current, such as battery 41. At a suitable point in the control pipe 20 of the first machine is located a cylinder 45 having a piston 46 provided with a stem 47. The cylinder has a head 48 which may conveniently be of insulating material. A spring 49 acting between head 48 and the piston impels the piston against the pressure of air entering the cylinder through port 50 in communication with pipe 20. Located on the cylinder head 48, which constitutes also an insulator, are contacts 51, connected in circuit 40. Piston stem 47 carries a metal contact 52, arranged to bridge contacts 51.

Cylinder 45, with its associated parts, represents any convenient device controlled by pressure in pipe 20 so that when the machine M is runing normally, piston 46 is moved outward against its spring and contact 52 is held away from contacts 51 and circuit 40 is interrupted. Whenever machine M is stopped by opening any of the valves V, the pressure in pipe 20 is reduced and piston 46 moved inward, causing contact 52 to engage contacts 51 and close circuit 40 and light the lamp S and so indicate to the operator of the second machine that the first machine is stopped. The signal device may be a bell or other electric indicator, instead of a lamp.

The second or subordinate machine may be provided with control mechanism including a control pipe 20 as described in connection with machine M. This control pipe may have one or more valves like valves V, the opening of any one of which will stop the second machine. If it is desired to stop the second machine automatically upon the stopping of the first machine M, suitable devices may be provided, of which the following is an example: In circuit 40, previously mentioned, or any other electric circuit controlled by a pressure operated device, such as cylinder 45, as previously described, is a solenoid 60, arranged to operate on armature 61, constituting one arm of a bell crank, the other arm 62 of which is connected by link 63 to handle 64 of a valve 65, which is one of the control valves of the control pipe line of the second machine. When the first machine is running normally circuit 40 is broken between contacts 51 as previously explained; solenoid 60 is inactive and valve 65 is closed. Consequently if the other control valves of the second machine are also closed the machine will run normally in conjunction with the first machine M. If the first machine is stopped by opening any of its control valves, pressure in pipe 20 is reduced; circuit 40 is closed between contacts 51, solenoid 60 is energized, attracting armature 61, and valve 65 is opened, reducing pressure in the control line of the second machine and stopping the machine. The control devices for the second machine may be so arranged that valve 65 must be closed by hand after the first machine is started. This is accomplished simply by the omission of any spring or equivalent device for closing valve 65. But when it is desired to start the second machine automatically upon starting the first machine, a spring 70 may be provided acting on bell crank 62 or on valve handle 64. Then when the first machine starts and pressure is exerted in pipe 20 sufficient to break circuit 40 at contacts 51, the solenoid is de-energized and spring 70 closes valve 65; pressure is built up in the control pipe of the second machine and the second machine started with no appreciable delay.

What I claim is:—

1. In control apparatus for a machine, means for stopping and starting the machine, a pneumatic operating device for said means, a control pipe connected to said pneumatic device, means for supplying air under pressure to said pipe, and a plurality of manually operated valves in said control pipe at different locations in relation to said machine, acting to stop the machine upon opening any of said valves by reducing pressure in the control pipe and to prevent starting the machine until all of said valves are closed.

2. In control apparatus for a machine, means for stopping and starting the machine, a pneumatic operating device for said means, a control pipe connected to said pneumatic device, means for supplying air under pressure to said pipe, means for regulating normal air pressure, a plurality of manually operated valves in said control pipe at different locations in relation to said machine, acting to stop the machine upon opening any of said valves by reducing pressure in the control pipe and to prevent starting the machine until all of said valves are closed.

3. In machine control apparatus, a machine, a drive clutch therefor, pressure operated means for engaging the clutch, a control pipe connected with said pressure operated means, means for supplying air under pressure to said pipe, and a plurality of manually operated valves in said pipe at different locations relative to said machine for discharging air from the pipe and reducing pressure to cause disengagement of the clutch and stop the machine.

4. In machine control apparatus, a machine, a drive clutch therefor, pressure operated means for engaging the clutch, a control pipe connected with said pressure operated means, means for supplying air under pressure to said pipe, means for regulating maximum air pressure, and a plurality of manually operated valves in said pipe at different locations relative to said machine for discharging air from the pipe and reducing pressure to cause disengagement of the clutch and stop the machine.

5. In machine control apparatus, a machine, a drive shaft, a clutch thereon, a drive connection from the clutch to the machine, pressure operated means on the shaft for operating the clutch, a control pipe communicating with said pressure operated means, means for supplying air under pressure to the pipe, and a plurality of manually operated bleeder valves in the pipe for reducing air pressure therein and stopping the machine by causing the pressure actuated means to disengage the clutch.

6. In machine control apparatus, a machine, a drive shaft, a clutch thereon, a drive connection from the clutch to the machine, pressure operated means on the shaft for operating the clutch, a control pipe communicating with said pressure operated means, means for supplying air under pressure to the pipe, means for regulating maximum air pressure, and a plurality of manually operated bleeder valves in the pipe for reducing air pressure therein and stopping the machine by causing the pressure actuated means to disengage the clutch.

7. In machine control apparatus, a machine, a drive shaft, a clutch thereon, a driving connection from the clutch to the machine, a pneumatic cylinder adjacent to the clutch, a piston therein connected to operate the clutch, means tending to retract the piston, a pneumatic control pipe communicating with the cylinder to supply air to move the piston and engage the clutch, means for supplying air under pressure to the pipe, and a plurality of manually operated bleeder valves in the pipe for discharging air to reduce pressure and disengage the clutch by the action of the piston retracting means.

8. In machine control apparatus, a machine, a drive shaft, a clutch thereon, a driving connection from the clutch to the machine, a pneumatic cylinder adjacent to the clutch, a piston therein connected to operate the clutch, means tending to retract the piston, a pneumatic control pipe communicating with the cylinder to supply air to move the piston and engage the clutch, means for supplying air under pressure to the pipe, adjustable means for regulating maximum air pressure, and a plurality of manually operated bleeder valves in the pipe for discharging air to reduce pressure and disengage the clutch by the action of the piston retracting means.

9. In machine control apparatus, a machine, a drive shaft therefor, a clutch on the drive shaft, a driving connection from the clutch to the machine, a pneumatic cylinder and a piston therein connected to operate the clutch, a spring for retracting the piston, a control pipe connected to the cylinder to apply pneumatic pressure to the piston to engage the clutch, a pump supplying air under pressure to the pipe, a driving connection from said shaft to the pump, and a plurality of manually operated bleeder valves in the control pipe to reduce pressure and disengage the clutch by action of the piston retracting spring.

10. In machine control apparatus, a first machine, driving means therefor, and drive control means comprising a pneumatic control line and means for stopping the first machine by reducing pressure in said control line, a controlling device for a second machine, and means for actuating said controlling device by variations of pressure in said control line.

11. In machine control apparatus, a first machine, driving means therefor, and drive control means comprising a pneumatic control line and a manually operated discharge valve for stopping the first machine by reducing pressure in said control line, a controlling device for a second machine, and means for actuating said controlling device by variations of pressure in said control line.

12. In machine control apparatus, a first machine, a drive clutch therefor, pneumatic clutch operating means, a control pipe communicating with said clutch operating means, means for supplying air under pressure to said control pipe, means for reducing pressure in the pipe to stop the machine, a control device for a second machine, and means for operating said control device comprising means actuated by variations of pressure in said control pipe.

13. In machine control apparatus, a first machine, a drive clutch therefor, pneumatic clutch operating means, a control pipe communicating with said clutch operating means, means for supplying air under pressure to said control pipe, a bleeder valve for reducing pressure in the pipe to stop the machine, a control device for a second machine, and means for operating said control device comprising means actuated by variations of pressure in said control pipe.

14. In machine control apparatus, a first machine, driving means therefor, and drive control means comprising a pneumatic control line and means for stopping the first machine by reducing pressure in said control line, a controlling device for a second machine, means for actuating said controlling device comprising an electric circuit, a motor device for said controlling device in said circuit, and means for closing and opening said circuit in accordance with variations of pressure in said control line.

15. In machine control apparatus, a first machine, driving means therefor, and drive control means comprising a pneumatic control line and means for stopping the first machine by reducing pressure in said control line, a controlling device for a second machine, means for actuating said controlling device, comprising an electric circuit, a magnet in said circuit connected to operate said controlling device when energized, and means for closing said circuit when pressure in said control line falls below a certain point and for opening the circuit when the pressure rises above that point.

16. In machine control apparatus, a first machine, a drive clutch therefor, pneumatic clutch operating means, a control pipe communicating with said clutch operating means, means for supplying air under pressure to said control pipe, means for reducing pressure in the pipe to stop the machine, a valve arranged to control a second machine, a magnet for opening said valve, an electric circuit for said magnet including a source of power, a movable interrupter interposed in said circuit and a device acted upon by pressure in said control pipe and connected to said interrupter to break the electric circuit when air pressure is above a certain point and to close the circuit when air pressure falls below that point to energize the magnet and open said valve to stop said second machine.

17. In machine control apparatus, a first machine, driving means therefor, and drive control means comprising a pneumatic control line and means for stopping the first machine by reducing pressure in said control line, a signal for a second machine, and means controlled by variations of pressure in said control line for operating said signal.

18. In machine control apparatus, a first machine, a drive clutch therefor, pneumatic clutch operating means, a control pipe communicating with said clutch operating means, means for supplying air under pressure to said control pipe, means for reducing pressure in the pipe to stop the machine, a signal for a second machine, an electric circuit for operating the signal, and means controlled by variations of pressure in said control pipe for opening and closing said circuit.

19. In machine control apparatus, a first machine, driving means therefor, means for stopping the first machine, including a plurality of independent manually-operated controlling devices, a signal adjacent to the second machine, and means controlled by the movement of one of said controlling devices for operating said signal.

20. In machine control apparatus, the combination with a machine to be driven, of a drive shaft, a clutch thereon, a connection from the driven member of the clutch to the machine, a pneumatic cylinder on the shaft and distinct from the clutch, means for preventing rotation of the cylinder, a piston in the cylinder, means tending to retract the piston, a clutch operating member connected with the piston, and control mechanism including an air pipe connected to the cylinder to move the piston to clutch engaging position, a plurality of manually-operated valves in the air pipe at different positions in relation to the machine, the opening of any valve serving to reduce air pressure and stop the machine and to prevent restarting the machine until all the valves are closed, an air pump driven from said shaft and supplying air under pressure to the pipe, and an adjustable air pressure regulator connected with the pipe and independent of the valves.

Signed at Chicago in the county of Cook and State of Illinois this 12th day of October A. D. 1920.

JAMES C. THOM.